US006948069B1

(12) United States Patent
Teppler

(10) Patent No.: US 6,948,069 B1
(45) Date of Patent: Sep. 20, 2005

(54) METHOD AND SYSTEM FOR DETERMINING AND MAINTAINING TRUST IN DIGITAL IMAGE FILES WITH CERTIFIABLE TIME

(75) Inventor: Steven W. Teppler, Sarasota, FL (US)

(73) Assignee: Time Certain, LLC, Kensington, MD (US)

(*) Notice: Subject to any disclaimer, the term of this patent is extended or adjusted under 35 U.S.C. 154(b) by 1028 days.

(21) Appl. No.: 09/609,645

(22) Filed: Jul. 3, 2000

Related U.S. Application Data

(60) Provisional application No. 60/142,132, filed on Jul. 2, 1999.

(51) Int. Cl.$^7$ .............................. H04L 9/00; H04K 1/00

(52) U.S. Cl. ...................... 713/178; 713/155; 713/156; 713/175; 713/176; 713/180; 713/181; 713/186; 713/200; 380/30

(58) Field of Search ............................... 713/178, 176, 713/175, 179, 180, 181, 155, 156, 186, 200; 380/30, 23

(56) References Cited

U.S. PATENT DOCUMENTS

| | | |
|---|---|---|
| 5,001,752 A | 3/1991 | Fischer |
| 5,022,080 A | 6/1991 | Durst et al. |
| 5,136,643 A | 8/1992 | Fischer |
| 5,136,646 A | 8/1992 | Haber et al. |
| 5,136,647 A | 8/1992 | Haber et al. |
| 5,189,700 A | * 2/1993 | Blandford .................. 713/178 |
| 5,373,561 A | 12/1994 | Haber et al. |

(Continued)

OTHER PUBLICATIONS

Final Office Action for U.S. Appl. No. 09/429,360, filed Sep. 14, 2004, 10 pgs.
Final Office Action for U.S. Appl. No. 09/609,646, filed Sep. 10, 2004, 17 pgs.
D. Mills, "Simple Network Time Protocol (SNTP) Version 4 for IPva, IPv6, and OSI", Oct. 1996.
Office Action for U.S. Appl. No. 09/609,646, filed Feb. 17, 2004.
Office Action for U.S. Appl. No. 09/421,279, filed Sep. 15, 2003.
Final Office Action for U.S. Appl. No. 09/421,279, filed Jan. 29, 2004.
Office Action for U.S. Appl. No. 09/249,360, filed Jan. 15, 2004.

*Primary Examiner*—Andrew Caldwell
*Assistant Examiner*—Courtney Fields
(74) *Attorney, Agent, or Firm*—Venable LLP; James R. Burdett; W. Russell Swindell

(57) ABSTRACT

A system and methods for proving dates of digital-imaging files, which are accessed, created, modified, received, saved, or transmitted by a computer includes a trusted time source in a tamperproof environment, a first subsystem for saving the file at a moment in time, a second subsystem for retrieving from the trusted time source a date and a time corresponding to the moment in time, a third subsystem for appending the date and the time retrieved from the trusted time source to the saved file, a fourth subsystem for signing the saved file with the date and the time retrieved from the trusted time source appended thereto, a fifth subsystem for hashing the signed file to produce a digest, a sixth subsystem for signing the digest with a key to produce a certificate, a seventh subsystem for appending the certificate to the saved file, and an eighth subsystem for saving the file with the certificate appended thereto. The trusted time source is a real time clock, which is not resettable, is independent of any system clock of the computer, and is installed locally relative to the computer.

16 Claims, 9 Drawing Sheets

U.S. PATENT DOCUMENTS

| | | | |
|---|---|---|---|
| RE34,954 E | | 5/1995 | Haber et al. |
| 5,422,953 A | | 6/1995 | Fischer |
| 5,500,897 A | | 3/1996 | Hartman, Jr. |
| 5,619,571 A | | 4/1997 | Sandstrom et al. |
| 5,748,738 A | * | 5/1998 | Bisbee et al. ............... 713/178 |
| 5,781,629 A | | 7/1998 | Haber et al. |
| 5,781,630 A | | 7/1998 | Huber et al. |
| 5,903,882 A | | 5/1999 | Asay et al. |
| 5,910,988 A | | 6/1999 | Ballard |
| 5,923,763 A | | 7/1999 | Walker et al. |
| 5,970,146 A | | 10/1999 | McCall et al. |
| 6,047,282 A | | 4/2000 | Wilson et al. |
| 6,081,899 A | | 6/2000 | Byrd |
| 6,209,090 B1 | | 3/2001 | Aisenberg et al. |
| 6,209,091 B1 | | 3/2001 | Sudia et al. |
| 6,226,744 B1 | | 5/2001 | Murphy et al. |
| 6,237,096 B1 | | 5/2001 | Bisbee et al. |
| 6,253,331 B1 | | 6/2001 | Kotani |
| 6,263,438 B1 | | 7/2001 | Walker et al. |
| 6,356,937 B1 | | 3/2002 | Montville et al. |
| 6,393,126 B1 | | 5/2002 | van der Kaay et al. |
| 6,393,566 B1 | | 5/2002 | Levine |
| 6,408,388 B1 | * | 6/2002 | Fischer ...................... 713/176 |
| 6,442,691 B1 | | 8/2002 | Blandford |
| 6,449,255 B1 | | 9/2002 | Waclawsky |
| 6,490,355 B1 | | 12/2002 | Epstein |
| 6,530,023 B1 | | 3/2003 | Nissl et al. |
| 6,601,172 B1 | | 7/2003 | Epstein |
| 2001/0011350 A1 | | 8/2001 | Zabetian |

\* cited by examiner

METHOD AND SYSTEM FOR DETERMINING AND MAINTAINING TRUST IN DIGITAL IMAGE FILES WITH CERTIFIABLE TIME

CROSS-REFERENCE TO RELATED APPLICATIONS

This application claims the benefit of U.S. Provisional Application No. 60/142,132, filed on Jul. 2, 1999, the contents of which are incorporated herein by reference. This application is related to the following co-pending, commonly assigned applications, each of which is incorporated by reference: U.S. patent application Ser. No. 09/421,279, entitled "SMART CARD SYSTEM AND METHODS FOR PROVING DATES IN DIGITAL DATA FILES," filed Oct. 20,1999; U.S. patent application Ser. No. 09/429,360, entitled "PERSONAL COMPUTER SYSTEM AND METHODS FOR PROVING DATES IN DIGITAL DATA FILES," filed Oct. 28, 1999; and U.S. patent application Ser. No. 09/609,646, entitled "SYSTEM AND METHODS FOR PROVING DATES IN DIGITAL DATA FILES," filed Jul.3, 2000.

COPYRIGHT NOTICE

Portions of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to digital data files, and more particularly to systems and methods for proving dates in such digital data files.

2. Statement of the Prior Art

Scope of the Problem

Digital data files come in many formats. None of those formats currently provide means for proving—with certainty—dates and times associated with access, creation, modification, receipt, saving, or transmission of such digital data files. This is not only due to the variety of application programs which are available for digital data file access, creation, modification, receipt, saving, and transmission, but also due to the much more varied "standards" and protocols put forth in the vain attempt to provide uniformity worldwide.

Illustrative of the enormity of the problem are the following operating environments, within which the system and methods according to the present invention can provide the much-needed but often ignored time certainty.

Digital Document Processing

"Processing" may be viewed as the manipulation of data within a computer system. Since virtually all computer systems today process digital data, processing is the vital step between receiving the data in binary format (i.e.. input), and producing results (i.e., output)—the task for which computers are designed.

The *Microsoft® Press Computer Dictionary, 3d Edition* (1997) defines the term document as"... any self-contained piece of work created with an application program and, if saved on disk, given a unique filename by which it can be retrieved." Most people think of documents as material done by word processors alone. To the typical computer, however, data is little more than a collection of characters. Therefore, a database, a graphic, or a spreadsheet can all be considered as much a document as a letter or a report. In the Macintosh environment in particular, a document is any user-created work named and saved as a separate file.

Accordingly, for the purpose of the invention described herein, digital document processing shall be interpreted to mean the manipulation of digital (i.e., binary) data within a computer system to create or modify any self-contained piece of work with an application program and, if saved on a disk or any other memory means, given a unique filename by which it can be retrieved. Examples of such application programs with which the present invention may be used to assist in such digital document processing are Microsoft® Access 97, Microsoft® Excel 97, and Microsoft® Word 97, each of which is available from Microsoft Corporation, Redmond, Wash. U.S.A.

Digital Communications

"Communications" may be broadly defined as the vast discipline encompassing the methods, mechanisms, and media involved in information transfer. In computer-related areas, communications usually involve data transfer from one computer to another through a communications medium, such as a telephone, microwave relay, satellite link, or physical cable.

Two primary methods of digital communications among computers presently exist. One method temporarily connects two computers through a switched network, such as the public telephone system. The other method permanently or semi-permanently links multiple workstations or computers in a network. In reality, neither method is distinguishable from the other, because a computer can be equipped with a modem, which is often used to access both privately owned and public access network computers.

More particular forms of digital communications (i.e., exchange of communications in which all of the information is transmitted in binary-encoded, digital format) include electronic mail (or less formally "e-mail"), facsimile, voicemail, and multimedia communications.

E-mail may be broadly defined as the exchange of text messages/computer files over a communications network, such as a local area network (LAN) or the Internet, usually between computers or terminals. Facsimile (or, again, less formally "fax") comprises the transmission and reception of text or graphics over telephone lines in digitized form. Conventional fax machines scan an original document, transmit an image of the document as a bit map, and reproduce the received image on a printer. Resolution and encoding of such fax messages are standardized in the CCITT Groups 1–4 recommendations. Fax images can likewise be sent and received by computers equipped with fax hardware and software.

The CCITT Groups 1–4 recommendations make up a set of standards recommended by the Comité Consultatif International Télégraphique et Téléphonique (now known as the International Telecommunication Union) for encoding and transmitting images over fax machines. Groups 1 and 2 relate to analog devices, which are generally out of use. Groups 3 and 4 deal with digital devices, and are outlined below.

Group 3 is a widespread standard that supports "standard" images of 203 horizontal dots per inch (dpi) by 98 vertical dpi, and "fine" images of 203 horizontal dpi by 198 vertical dpi. Group 3 devices support two methods of data compression. One is based on the Huffman code, and reduces an image to 10 to 20 percent (10%–20%) of the original. The other, known as "READ" (for "relative element address designate"), compresses an image to about six to twelve percent (~6%–12%) of its original. Additionally, the READ method provides for password protection as well as polling, so that a receiving machine can request transmission as appropriate.

Group 4 is a newer standard, which supports images of up to 400 dpi. Its method of data compression is based on a beginning row of white pixels, or "dots", with each succeeding line encoded as a series of changes from the line before. Images are compressed to about three to ten percent (~3%–10%) of the original. Group 4 devices do not include error-correction information in their transmission. Moreover, they require an Integrated Services Digital Network (ISDN) phone line rather than a traditional dial-up line.

Fax modems may also be used to send and receive digital data encoded in known fax formats (e.g., one of the CCITT groups noted above). Such data is either sent or received by a fax machine or another modem, which then decodes the data and converts it to an image. If the data was initially sent by fax modem, the image must previously have been encoded on the computer hosting such fax modem. Text and graphic documents can be converted into fax format by special software that is usually provided with the fax modem. Paper documents must first be scanned in. As is well known, fax modems may be internal or external and may combine fax and conventional modem capabilities.

Voicemail generally comprises a system that records and stores telephone messages in a computer's memory. Unlike a simple answering machine, voicemail systems include separate mailboxes for multiple users, each of whom can copy, store, or redistribute messages. Another type of digital communications involving voice is "voice messaging", a term which generally refers to a system that sends and receives messages in the form of sound recordings. Typical voice messaging systems may employ "voice modems", which are modulation/demodulation devices that Support a switch to facilitate changes between telephony and data transmission modes. Such a device might contain a built-in loudspeaker and microphone for voice communication, but more often it uses the computer's sound card.

Still another form of digital communications includes multimedia communications in the style of "video teleconferencing", as defined by the International Telecommunication Union (formerly CCITT) in "Visual Telephone Systems and Equipment for Local Area Networks Which Provide a Non-Guaranteed Quality of Service," (Recommendation H.323, Telecommunication Standardization Sector of ITU, Geneva, Switzerland, May 1996) and other similar such standards.

Digital-imaging

"Digital-imaging" encompasses those known processes involved in the capture, storage, display, and printing of graphical images. They may involve devices known as a "digital camera", which broadly refers to a camera that stores photographed images electronically instead of on traditional film. Digital cameras typically use charge-coupled device (CCD) elements to capture the image through the lens when the operator releases the shutter in the camera. Circuits within the camera cause the image captured by the CCD to be stored in a storage medium, such as solid-state memory or a hard disk. After the image has been captured, it is downloaded by cable to the computer using software supplied with the camera. Once stored in the computer, the image can be manipulated and processed much like the image from a scanner or related input devices. Digital cameras come in the form of still cameras and full-motion video recorders.

Other forms of digital-imaging include digitizing systems, such as the "PhotoCDO®" system from Eastman Kodak Company, Rochester, N.Y. That system allows 35mm film pictures, negatives, slides, and scanned images to be stored on a compact disc. Images are then stored in a file format known as the Kodak PhotoCD Image Pac File Format, or PCD. Many photography and film development businesses offer this service. Any computer with CD-ROM capabilities can usually view images stored on a PhotoCD and the software required to read PCD. Additionally, such images can be viewed by any one of a variety of players that are specifically designed to display images stored on CDs. Another photographic form of digital-imaging is defined by the "Flashpix" specification, the cooperative endeavor of the Digital-imaging Group, Microsoft, the Hewlett-Packard Company, and Live Picture, Inc. The Flashpix format builds on the best features of existing formats (e.g. Kodak Image Pac, Live Picture IVUE, Hewlett-Packard JPEG, TIFF, TIFF/EP, etc.), and combines these features with an object orientated approach.

Still other forms of digital-imaging include digital radiography, radiotherapy, x-ray, positron emission tomography, ultrasound, and magnetic resonance imaging according to the joint work of the American College of Radiology (ACR) and the National Electrical Manufacturers Association (NEMA), published in the *Digital-imaging and Communications in Medicine PS* 3-1998 (DICOM Standard).

Digital Commerce

An enormous, amount of commercial activity now takes place by means of connected computers. Such commercial activity has been variously coined as digital commerce, electronic commerce, or just plain E-commerce. Regardless of its particular moniker, these activities generically involve a commercial transaction between a user and a vendor through an online information service, the Internet, or a BBS, or between vendor and customer computers through a specialized form of E-commerce known as electronic data interchange (EDI).

EDI is collectively known for its set of standards to control the transfer of business documents (e.g., purchase orders and invoices) between computers. The ultimate goal of EDI is the elimination of paperwork and increased response time. For EDI to be most effective, users must agree on certain standards for formatting and exchanging information, such as the X.400 protocol and CCITT X series.

Other known forms of E-commerce include digital banking, web-front stores, and online trading of bonds, equities, and other securities. Digital banking can take the form of access to a user's account, payment of bills electronically, or transfer of funds between a user's accounts. Web-front stores (e.g., amazon.com) usually comprise a collection of web pages in the form of an electronic catalog, which offers any number of products for sale. More often than not, transactions at such web-front stores are consummated when a purchaser enters his credit card number, and the issuing bank approves the purchase. These transactions may or may not be over secure lines, such as those designated "TRUSTe" participant web sites. Further details regarding known processes for establishing and maintaining secure E-commerce connections may be found in the SET Secure *Electronic Transaction Specification, Book* 1: *Business Description* (Version 1.0), May 31, 1997, the contents of which are incorporated herein by reference. See also *Book* 2 (*Programmer's Guide*) and *Book* 3 (*Formal Protocol Definition*) of the *SET Secure Electronic Transaction Specification*, as well as the *External Interface Guide to SET Secure Electronic Transaction*, Sept. 24, 1997, each of which is incorporated herein by reference.

One burgeoning form of E-commerce that has arisen in the past few years is that which involves dealing in securities online. "Day traders" watch impatiently as ticker symbols speed across their computer screens. When the price is right, they electronically whisk their order off to a distant securities dealer—often buying and selling the same stock or bond in a fifteen-minute span of time. One can only imagine the potential problems associated with the purchase or sale of securities when price-per-share movements on the order of a few cents make the difference to these day traders. Fortunately, the National Association of Securities Dealers (NASD) has come up with its Order Audit Trail Systems (OATS$^{SM}$) to track all stock transactions. NASD Rule 6953 also requires all member firms that have an obligation to record order, transaction, or related data under the NASD Rules or Bylaws to synchronize the business clocks that are used for recording the date and time of any market event. Computer system and mechanical clocks must be synchronized every business day before market open, at a minimum, in order to ensure that recorded order event timestamps are accurate.

Digital Justice

Even legal scholars and systems around the world have been unable to escape the problems of an online world. Utah became the first jurisdiction in the United States of America to enact legislation creating "cybernotaries". Similar laws in Georgia, Florida, and Massachusetts quickly followed Utah.

In August 1996, the American Bar Association (through its Information Security Committee of the Electronic Commerce and Information Technology Division, Section of Science and a Technology) published the *Digital Signature Guidelines—Legal Infrastructure for Certification Authorities and Secure Electronic Commerce*. The European Union, as well, in a final report on the *Legal Issues Of Evidence And Liability In The Provision Of Trusted Services (CA and TTP Services*), let its position be known in October 1998.

Each of the environments noted above is fraught with potential fraud. Any reliance they may have on dates and times is merely for the purpose of determining whether the transaction is valid (i.e., authorized within a specified range of time), or what specific time delays occur in the transmission of data between the computer systems communicating with one another. However, none of those environments currently provide means for proving—with certainty—dates and times associated with access, creation, modification, receipt, or transmission of digital data files, which may be used therein.

Prior Art Attempts to Solve the Problem

Many-varied computing means pervade today's society. PCs, web browsers, e-mail clients, e-mail servers, network file servers, network messaging servers, mainframes, Internet appliances, wireless telephones, pagers, PDAs, fax machines, fax modems, digital still cameras, video cameras, voice recorders, video recorders, copiers, and scanners, and virtually any other device using digital data files are fast becoming ubiquitous.

Digital data is easy to modify. As a result, it has been nearly impossible in the prior art to establish with certainty the date and time a particular digital data file in a given computing means was accessed, created, modified, received, saved, or transmitted. It should be understood that, by use of the term "computing means", the present invention is directed to general purpose computers, PCs, web browsers, e-mail clients/servers, network file/messaging servers, mainframes, Internet appliances, wireless telephones, pagers, PDAs, fax machines, digital still/video cameras, digital voice/video recorders, digital copiers/scanners, interactive television, hybrid combinations of any of the above-noted computing means and an interactive television (e.g., set-top boxes), and any other apparatus, which generally comprises a processor, memory, the capability to receive input, and the capability to generate output.

Such computing means typically include a real time clock ("RTC") for keeping track of the time and date. Likewise, operating systems and/or applications programs used in such computing means usually stamp the time and date (as derived from the RTC) that each of the digital data files accessed, created, modified, received, saved, or transmitted. Such stamping of digital data files with times and dates (collectively referred to as "time-stamping") has, thus, become an integral part of all of the above known computing environments.

Although the existing framework of time-stamping can be used to catalogue and sort one's own files, for other critical needs it suffers from two fatal flaws. Files are typically "time-stamped" with a value read from the RTC. There is no simple way of determining whether the RTC is set to the correct date and time. Indeed, it is quite trivial for a user to reset the RTC to any desirable date and time. Even if the computing means' RTC had been correctly set, nothing would prevent a user from arbitrarily changing the "time-stamps" themselves. This is readily accomplished through the direct manipulation of the digital data where the time-stamp is stored.

Thus, the known time-stamping framework is useless for any situation where the accuracy of the date or time of a digital data file is critical. Court filings, medical records, files presented as incriminating or exculpatory evidence in court cases, legal documents such as wills, billing records, patent, trademark, and copyright claims, and insurance documents are only a few of the areas where the date and time that is associated with the file is critical. Conventional systems and methods that time-stamp digital data files fail to meet this need. Furthermore, there is no "open", cross-platform, interoperable global standard in place to create trusted time-stamps.

Cryptographic Systems and Keys

One approach that has been used in the past to provide some level of security in digital data files is the use of cryptographic systems and keys. In general, cryptographic systems are used to encrypt or "lock" a digital data file. A key is used, conversely, to decrypt or "unlock" an encrypted digital data file. Digital data files are merely bits of data in memory or on a network. If this data is viewed as the mere representation of large numbers, then mathematical functions or algorithms can be easily applied to the data.

For example, where a particular digital data file is a text file, its unencrypted or "cleartext" version can be viewed as the variable x. The resulting function of this variable x, when encrypted by its associated cryptographic algorithm and coupled with its key k will be f (k, x). Accordingly, the encrypted text or "cyphertext" can be defined by the equation:

$$y=f(k,x).$$

By choosing the cryptographic algorithm carefully—such that there is no easily discovered inverse mapping (i.e., for any given y, it will be extremely difficult to calculate x without knowing k, while at the same time, with knowledge of k it will be possible)—the data may be encrypted.

Symmetric Cryptography

If the key for encryption and decryption is the same shared secret, then the cryptographic system and associated algorithm will be referred to as "symmetric". Both the sender and the receiver must share the key in such symmetric cryptographic systems. A sender first applies the encryption function using the key to the cleartext to produce the cyphertext, which is then sent to a receiver. The receiver applies the decryption function using the same shared key. Since the cleartext cannot be derived from the cyphertext without knowledge of the key, the cyphertext can be sent over public networks such as the Internet.

The current United States standard for symmetric cryptography, in which the same key is used for both encryption and decryption, is the Data Encryption Standard (DES), which is based upon a combination and permutation of shifts and exclusive ors. This approach can be very fast, whether implemented directly on hardware (e.g., 1 GByte/sec throughput or better) or in general purpose processors. The current key size of 56 bits (plus 8 parity bits) is sufficient, yet somewhat small, but the growing use of larger keys with "triple DES" generate much greater security. Since the implementation of DES is fast, it can easily be pipelined with software codecs and not impact system performance.

An alternative and yet stronger form of symmetric block encryption is IDEA. Its security is based upon combining exclusive ors with addition and multiplication in modulo-16 arithmetic. The IDEA approach is also fast on general purpose processors. It is comparable in speed to known DES implementations. One major advantage of IDEA is its keys, which are 128 bits and are, thus, much stronger (i.e., harder to break) than standard 56-bit DES keys.

One particular problem with the use of such symmetric systems is the problem of getting the sender and the receiver to agree on the key without anyone else finding out. Moreover, the problem becomes greatly complicated when additional users (i.e., potential senders and receivers) are added to the system. Such symmetric cryptographic systems, nevertheless, are by far easier to implement and deploy than their asymmetric counterparts since they require far less infrastructure. Sometimes with a symmetric cryptographic system, however, keys are submitted over the network. Avoidance of this security risk would be desirable.

Asymmetric Cryptography

Systems that generate and employ a secure key pair (i.e., a "private key" for creating the "digital signature" and a "public key" to verify that digital signature) are typically known as asymmetric cryptographic systems. There are many known cryptographic algorithms (e.g., RSA, DSA, and Diffie Hellman) that involve a key pair. In such asymmetric cryptographic systems, the private key and the public key are mathematically linked. The private key can only decrypt anything that is encrypted by the public key. Conversely, the public key can only verify anything that is signed by the private key. Asymmetric cryptographic systems are, thus, inherently more secure than symmetric or shared secret systems. The sensitive private key need exist in only one place. No form of the private key is ever transmitted over the network. Typical asymmetric cryptographic systems also scale to many users more easily than shared secret systems. However, in the infrastructure that is necessary to field systems of this type, commonly called a "Public Key Infrastructure" (PKI), is non-trivial to implement. See, e.g., RFC 1422, *Privacy Enhancement for Internet Electronic Mail: Part II: Certificate-Based Key Management* (February 1996), the contents of which are incorporated herein by reference.

Digital Signatures

Referring now to FIGS. 1 and 2, wherein like reference characters or numbers represent like or corresponding parts throughout each of the several views, an exemplary process 100 for creating a digital signature is shown in FIG. 1. To sign a document, or for that matter any other digital data file, a "signer" must first delimit the borders of the digital data file to be signed. As used herein, the term signer refers to any person who creates a digital signature for a message, such as message 110. The information delimited by the signer, in turn, refers to that message 110. A hash function 120 in the signer's software is used to compute a hash result 130, which is unique for all practical purposes to the message 110. Thereafter, a signing function 140 is used to transform the hash result 130 into a digital signature 160, but only after input of the signer's private key 150.

This transformation is sometimes referred to as a process of encryption. However, such a characterization would be inaccurate, because message 110 itself may, or may not be confidential. Confidentiality may be provided as an optional feature in most digital signature technologies, but the separate and distinct security service of confidentiality is not central to the security services of signer authentication, document authentication, or digital data file authentication. In any case, the resulting digital signature 160 is unique to both the message 110 and the private key 150, which is used to create the digital signature 160.

Typically, most digital signatures 160 (i.e., the digitally-signed hash result of message 110) are used in one of two ways. They may be attached to their associated message 110 and, thereafter, simply stored. In the alternative, they may be copied 170 and coupled with digital signature 160, in the form of a single data element 180 and, thereafter, transmitted 190 to a verifier.

This single data element 180 is, in some cases as will be described in greater detail herein below, referred to as a "digital certificate". Furthermore, the digital signature 160 may be simply transmitted or stored as a separate data element, so long as it maintains a reliable association with its message 110. Each digital signature 160 is unique to the specific message 110, which has been used to create it. Otherwise, it would be counterproductive if the digital signature 160 was wholly disassociated from that message 110.

An exemplary verification process 200 for verifying digital signature 160 is shown in FIG. 2. Element 180, comprising digital signature 160 attached to message 110, is first received 190 from the signer. A new hash result 220 of the original message 110 is then computed by the verifier by means of the same hash function 120 used to create the digital signature 160.

It should be noted at this juncture that use of the term "to verify" herein, with respect to any given digital signature, message, and public key, refers to those processes of accurately determining that: (1) the digital signature 160 was created during the "operational period" of a valid certificate 180 by the private key 150 corresponding to the public key 260 listed in the certificate 180; and (2) the message 110 had not been altered since its digital signature 160 was created.

It should also be noted at this juncture that use of the term "operational period" herein refers to a period that begins on a date and time a certificate 180 is issued by a "certification authority", or on a later date and time certain if stated in the certificate 180, and ends on a date and time it expires or is earlier revoked or suspended.

Then, by use of the public key 260 and such new hash result 220, the verifier can check: (1) whether the digital signature 160 was created using the signer's private key 150; and (2) whether the newly computed hash result 220 matches the original hash result 130, which was transformed into the digital signature 160 during the signing process.

Most known verification software will confirm the digital signature 160 as "verified" if two conditions are satisfied. One condition will be satisfied if the signer's private key 150 was used to digitally sign the message 110. This condition will be met if the signer's public key 260 was used to verify the digital signature 160, because the signer's public key 260 is capable of verifying only a digital signature 160 that is created with the signer's private key 150. The other condition will be satisfied if message 110 was received unaltered. This condition will be met if the hash result 220 that is computed by the verifier turns out to be identical to the hash result 130 that is extracted from digital signature 160 during the verification process. A verifier function 240 is used to make these comparisons, while further processing of the message 110 is dependent upon whether message 110 is determined to be valid at step 280.

Digital Certificates

The term "digital certificate" as used herein generally refers to any message, which at least (1) identifies the certification authority (CA) issuing it; (2) names or identifies its "subscriber"; (3) contains the subscriber's public key; (4) identifies its operational period; and (5) is digitally signed by the CA issuing it. Metaphorically, digital certificates serve as electronic substitutes for a sealed envelope or a signer's signature. In one case, for example, VeriSign Digital ID™ (a trademark of VeriSign, Inc., Mountain View, Calif.) securely resides in a signer's Internet browser or e-mail software, and enables that signer to digitally sign and encrypt e-mail. Digital certificates can also be viewed as electronic equivalents of a driver's license or a passport. Containing information that uniquely identifies the signer, the digital certificate allows the signer to: (1) digitally sign a message so the recipient knows that a message actually originated from the signer; and (2) encrypt a message so the intended recipient can decrypt and read its contents and attachments. Most digital certificates are easy to use, with point-and-click interfaces in all of the popular browsers and e-mail packages. A person seeking to verify a digital signature needs, at a minimum, (1) the public key corresponding to the private key used to create the digital signature, and (2) reliable evidence that the public key (and thus the corresponding private key of the key pair) is identified with the signer. The basic purpose of the digital certificate is to serve both these needs in a reliable manner.

Dual Signatures

As noted herein above, digital signatures and digital certificates have both been used in the past to provide some level of certainty as to the identity of a particular person accessing, creating, modifying, receiving, saving, or transmitting a digital data file. E-commerce presents other challenges for securing digital data files. In particular, the process of providing secure electronic transactions has raised the concerns for maintaining a person's privacy. An approach that has been used in the past to provide such security is known as "dual signatures", and is illustrated below.

User B wants to send User A an offer to purchase a piece of property that User A owns and an authorization to his bank to transfer the money if User A accepts the offer. Nevertheless, User B does not want the bank to see the terms of his outstanding offer to User A, nor does he want User A to see his bank account information. User B also wants to link his offer to the transfer such that the money will only be transferred if User A accepts his offer. According to the *SET Secure Electronic Transaction Specification*, User B accomplishes all of this by digitally signing both messages with a single signature operation that creates a dual signature.

Such a dual signature is generated in four steps. First, a message digest is created for both messages sent by User B (i.e., one to User A, and one to the bank). The resulting pair of message digests is then concatenated together. Next, a message digest of the concatenated result is created. This third message digest is finally encrypted with the User B's private signature key. User B must include the message digest of the other message in order for a recipient to verify his dual signature. The recipient of either message can then check its authenticity by generating the message digest on its copy of the message, concatenating it with the message digest of the other message (as provided by the User B), and thereafter computing the message digest of the result. If the newly generated digest matches the decrypted dual signature, the recipient can trust the authenticity of the message.

In the event that User A accepts User B's offer, she sends a message to the bank indicating her acceptance and including the message digest of the offer. The bank can verify the authenticity of User B's transfer authorization, and ensure that the acceptance is for the same offer by using its digest of the authorization and the message digest presented by User A of the offer to validate the dual signature. On the one hand, the bank can therefore check the authenticity of the offer against the dual signature. It cannot, on the other hand, see the terms of the offer.

Further details regarding such known processes may be found in the *SET Secure Electronic Transaction Specification, Book* 1: *Business Description* (Version 1.0), May 31, 1997, the contents of which are incorporated herein by reference. See also *Book* 2 (*Programmer's Guide*) and *Book* 3 (*Formal Protocol Definition*) of the *SET Secure Electronic Transaction Specification*, as well as the *External Interface Guide to SET Secure Electronic Transaction*, Sep. 24, 1997, each of which is incorporated herein by reference.

As is best illustrated by reference to FIG. 3, the process of creating such dual signatures will now be described in greater detail. User A runs the property description 305 through a one-way algorithm 310 to produce a unique value known as the message digest 315. This is a kind of digital fingerprint of the property description 305, and will be used later to test the integrity of the message. She then encrypts the message digest 315 with her private signature key 320 to produce her digital signature 325. Next, she generates a random symmetric key 330 and uses it to encrypt the combination of the property description 305, her signature 325 and a copy of her certificate 335 containing her public signature key 340 (collectively referred to as the message 345).

To decrypt the property description 305, user B will require a secure copy of this random symmetric key 330. User B's certificate 350, which user A must have obtained prior to initiating secure communication with him, contains a copy of his public key-exchange key 355. To ensure secure transmission of the symmetric key 330, user A encrypts it first using user B's public key-exchange key 350. The encrypted key, referred to as the digital envelope 360, will then be sent to user B along with the encrypted message 345 itself.

Likewise, the decryption process consists of the following steps. User B receives the message 345 from user A and decrypts the digital envelope 360 with his private key-exchange key 365 to retrieve the symmetric key 330. He uses the symmetric key 330 to decrypt the property description 305, user A's signature 325, and her certificate 335. He decrypts user A's digital signature 325 with her public signature key 340, which he acquires from her certificate 335. This recovers the original message digest 315 of the property description 305. He runs the property description 305 through the same one-way algorithm 310 used by user A and produces a new message digest 370 of the decrypted property description 305. Finally, he compares his message digest 370 to the one 315 obtained by use of user A's public signature key 340 contained within her digital signature 325. If both digests 315, 370 are exactly the same, user B then confirms that the message content has not been altered during transmission and that it was signed using user A's private signature key 320. On the other hand, if digests 315, 370 are not the same, then message 305 either originated somewhere else or was altered after it was signed. User B could then elect to take some appropriate action, such as notifying user A or discarding the message 305.

Digital Time-Stamps

A digital time-stamping service (DTS) issues time-stamps, which associate a date and time with a digital document in a cryptographically strong way. The digital time-stamp can be used at a later date to prove that an electronic document existed at the time stated on its time-stamp. For example, a physicist who has a brilliant idea can write about it with a word processor and have the document time-stamped. The time-stamp and document together can later prove that the scientist deserves the Nobel Prize, even though an arch rival may have been the first to publish.

The manner in which such conventional time-stamping systems work is illustrated in FIG. 4. Hypothetically, a user at a computing means 400 signs a document and wants it time-stamped. The user first computes a message digest 420 of the document using a secure hash function, and second sends the message digest 420 (but not the document itself) to the DTS 440. The DTS 440 sends the user in return a digital time-stamp 460 consisting of the message digest, the date and time it was received at the DTS 440, and the signature 480 of the DTS 440. Since the message digest 420 does not reveal any information about the content of the document, the DTS 440 cannot eavesdrop on the documents it time-stamps. Thereafter, the user can ostensibly present the document and time-stamp 460 together to prove when the document was written. A verifier then computes the message digest 420 of the document, makes sure it matches the digest in the time-stamp 460, and verifies the signature 480 of the DTS 440 on the time-stamp 460.

To be reliable, the time-stamps must not be forgeable. The DTS 440 itself must have a long key if the time-stamps are to be reliable for long periods of time (e.g., several decades). Moreover, the private key of the DTS 440 must be stored with utmost security, as in a tamperproof box. The date and time must come from a clock, also inside the tamperproof box, which cannot be reset and which will keep accurate time for years or perhaps for decades. It must also be infeasible to create time-stamps without using the apparatus in the tamperproof box.

All of the above requirements greatly complicate the process of obtaining legally sufficient proof of the date and time a digital data file was accessed, created, modified, received, saved, or transmitted. In fact, time-stamping a document in the manner described above only certifies the date and time that the message digest 420 was received by the DTS. It provides no proof of the date and time that the document was accessed, created, modified, saved, or transmitted. Moreover, because the DTS is located remotely relative to the user, there is no reliable way to provide a digital time-stamp locally at the user's site.

One cryptographically-strong DTS, first implemented by Bell Communications Research, Inc. (also known as "Bellcore"), only uses software and avoids many of the requirements just described such as tamperproof hardware. It essentially combines hash values of documents into is data structures known as binary trees. The "root" values of such binary trees are then periodically published in the newspaper. In these Bellcore systems, the time-stamp consists of a set of hash values, which allow a verifier to recompute the root of the tree. Since the hash functions are one-way, the set of validating hash values cannot be forged. The time associated with the document by the time-stamp is the date of publication.

The following Bellcore patents are illustrative of the above-described approach: U.S. Pat. No. 5,136,646, for "Digital Document Time-Stamping With Catenate Certificate" (Haber et al.); U.S. Pat. No. 5,136,647, for a "Method for Secure Time-Stamping of Digital Documents" (Haber et al.); U.S. Pat. No. 5,373,561, for a "Method for Secure Time-Stamping of Digital Documents" (Haber et al.); and U.S. Pat. No. Re. 34,954, which is the reissue of the '647 patent noted above and is, likewise, directed to a "Method for Secure Time-Stamping of Digital Documents" (Haber et al.). Other patents which are illustrative of similar such approaches are U.S. Pat. No. 5,748,738, for a "System and Method for Electronic Transmission, Storage and Retrieval of Authenticated Documents" (Bisbee et al.), which is assigned to Document Authentications Systems, Inc.; and U.S. Pat. No. 5,781,629, for a "Digital Document Authentication System" (Haber et al.), which is assigned to Surety Technologies, Inc. The contents of each of the above patents are incorporated herein by reference.

While each of the above approaches uses software and avoids many of the requirements for tamperproof hardware, they still require a trusted source at a remote location. None of the patents listed above teach or suggest any system or method that is capable of providing a trustworthy time-stamp at the precise location where the user's digital data files are accessed, created, modified, received, saved, or transmitted. Moreover, all of the methods described in the patents listed above still leave open the possibility that two individuals may collude to falsely state the value of a hash.

Undetected alterations may still be made with appropriate cryptographic techniques. For example, one may alter a document as desired and then make other suppressed changes, such as a carriage return followed by a space-up command. Both original document and altered document may, therefore, have the same hash value. See, for example, B. Schneier, *Applied-Cryptography*, Chapter 3.8, "Timestamping Services", pages 61–65 (John Wiley & Sons, Inc. 1994), the contents of which are incorporated herein by reference.

One approach seeking to avoid such possibilities is described in U.S. Pat. No. 5,781,630 (Huber et al), which discloses a system including a cryptomodule that is coupled to a computer. A cryptomodule in accordance with the Huber at al. patent includes a processor, an interface coupling the processor to the computer, and memory containing algorithms and constants for three purposes: (1) encoding a document, (2) generating a digital signature to be appended to the document, and (3) producing a time-stamp to be inserted into the document. The cryptomodule also includes a pair of clocks, one of which is a radio clock and the other of which is a "non-adjustable" quartz clock.

This system according to the '630 patent depends on a comparison of the two clocks before inserting a time-stamp into the document. That is, the time that the document was created, edited, received, saved, or transmitted is retrieved from both clocks and compared. Any discrepancy between the times retrieved is then determined. If, and only if, those discrepancies are sufficiently small, will a time-stamp based on the radio clock be inserted into the document and the document then encoded.

Another approach, which seeks to avoid problems of collusion and/or fraud, is described in U.S. Pat. No. 5,619,571 (Sandstrom et al.). Briefly summarized, Sandstrom et al. discloses an improved method of storing or retrieving electronic records, particularly those in the form of image streams (e.g., TIFF). An image identification code, time data provided by a trusted source, and a password are combined to generate a key. The image identification code and time data are stored in a public directory associated with the image data stream. Attributes of the image stream (e.g., its size and a hash of at least a segment of the image data) are also determined. The attributes are then used to generated a verification code. Subsequently, the verification code is first positioned within a private area associated with the data image stream, and then the private area is encrypted with the previously generated key.

This approach, however, suffers from two obvious disadvantages. Not only is it limited to image file formats having public and private areas, but it is also still dependent on a remote source for the time-stamp and the image identification code. It would be much more desirable to provide systems and methods of time-stamping digital data files locally and without the continuing reliance on a remote trusted source.

Still another approach to provide authenticated documents, with an authenticated time code, is described in U.S. Pat. No. 5,189,700 (Blandford). Blandford's device includes an RTC and an encryption means, which are together sealed in a tamperproof package. Powered by a battery that is located outside the tamperproof package, the RTC is used either: (1) to supplant the system clock of a computer, such that the computer cannot be booted up with an incorrect time; or (2) to provide an encrypted authentication code of time. Such time code is derived from a time retrieved from the RTC, which is combined with a device identification number. A secret key contained within the encryption means then encrypts the combination.

While devices according to Blandford, in fact, meet the objective of provided a local source of trusted time, they nevertheless suffer from two major disadvantages. Both disadvantages arise out of the design requirements of such devices. First, Blandford requires the RTC to override the computer's system clock on boot up. It would be much more desirable to avoid changing system settings in the computer, particularly the setting of its system clock. Second, Blandford requires that the RTC be powered by a source (i.e., the battery) outside of the tamperproof package. This, it is suggested, is critical to assuring several objectives: (1) ensuring that the RTC cannot be reset, or it can be reset only under strict procedures; (2) allowing the battery to be replaced in the power-up state without affecting the RTC; and (3) disabling the device, and potentially even the computer, in the event that power from the source failed. Obviously, it would be much more desirable to avoid such inconveniences.

SUMMARY OF THE INVENTION

It is, therefore, a general object of the present invention to provide novel systems, apparatus, and methods of preventing fraud in digital data files. More specifically, it is a particular object of this invention to provide systems, apparatus, methods, and articles of manufacture for proving the integrity of digital-imaging files. Another more particular object of the present invention is to provide such systems, apparatus, methods, and articles of manufacture for time-stamping digital-imaging files, which do not continually rely on a remote trusted source of time.

In accordance with one important aspect of the present invention, the systems and methods are directed to computing means. Non-limiting examples of such "computing means" include any: general purpose computer; mainframe; PC; web browser; e-mail client; e-mail server; network file or messaging server; Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output. Apparatus according to the present invention also includes such computing means programmed with software to operate the computing means in accordance with the invention.

According to another important aspect of the present invention, the article of manufacture disclosed herein comprises a computer-readable medium embodying code segments to control a computer to perform the invention. Non-limiting examples of such "computer-readable medium" in this regard include any: magnetic hard disk; floppy disk; optical disk, (e.g. a CD-ROM, a CD-R, a CD-RW, or any disk compliant with known DVD standards); magneto-optical disk; magnetic tape; memory chip; carrier wave used to carry computer-readable electronic data, such as are used in transmitting and receiving e-mail or in accessing a network, including the Internet, intranets, extranets, virtual private networks (VPN), local area networks (LAN), and wide area networks (WAN); or any other storage device used for storing data accessible by a computer. Non-limiting examples of"code segments" include not only source code segments and object code segments, but also computer programs in any language, instructions, objects, software, or any means for controlling a computer.

The above and other objects and aspects according to the present invention are provided by a system and methods for proving dates of digital-imaging files, which generally comprises a trusted time source, means for saving the file at a moment in time, API means for selectively retrieving from the trusted time source a date and a time corresponding to the moment in time, and means for appending the date and the time retrieved from the trusted time source to the saved file. Such system and methods may further comprise means for signing the saved file with the date and the time retrieved from the trusted time source appended thereto, means for hashing the signed file to produce a digest, means for signing the digest with a key to produce a certificate, means for appending the certificate to the saved file, and means for saving the file with the certificate appended thereto. All of the foregoing means are preferably sealed together within a tamperproof environment.

DETAILED DESCRIPTION OF THE INVENTION

Figure 1:
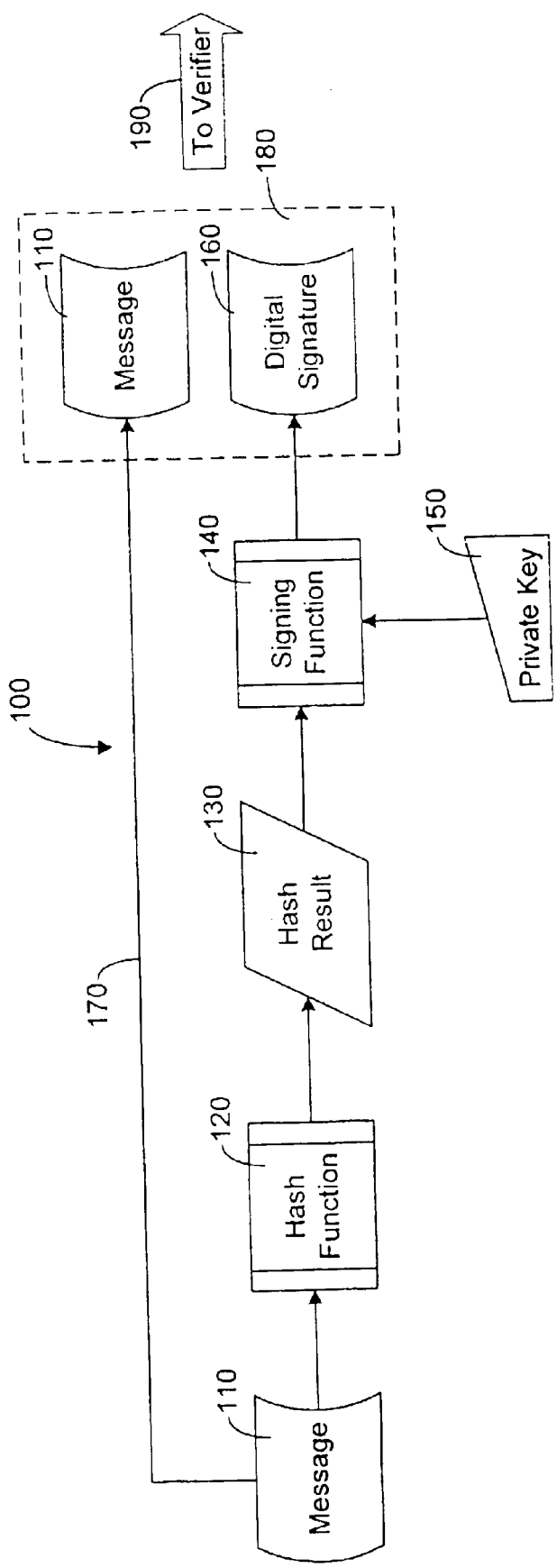
FIG. 1 is a block diagram, which illustrates one conventional process for creating a digital signature.
Figure 2:
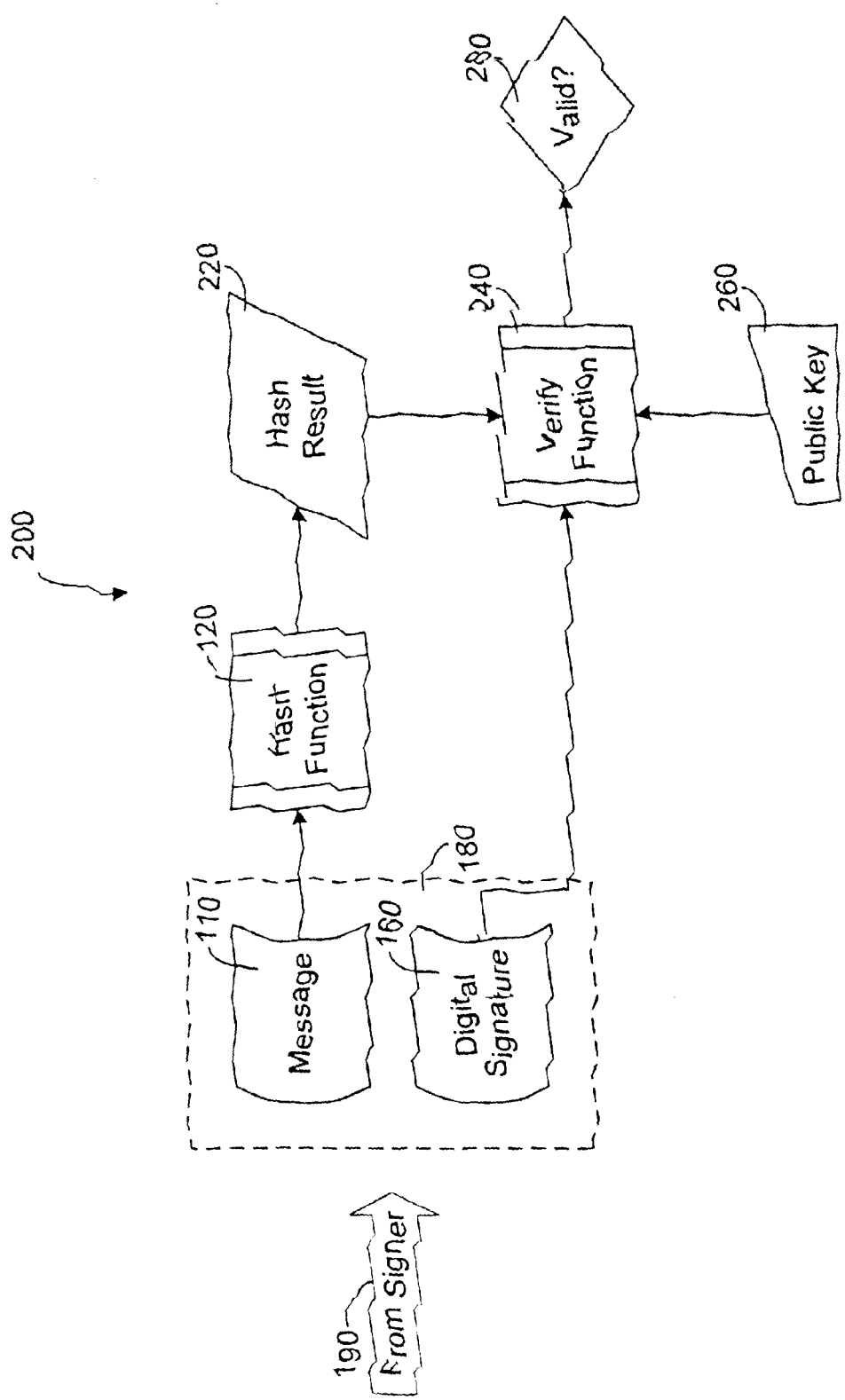
FIG. 2 is a block diagram, which illustrates another conventional process for verifying the digital signature created by the process shown in FIG. 1.
Figure 3:
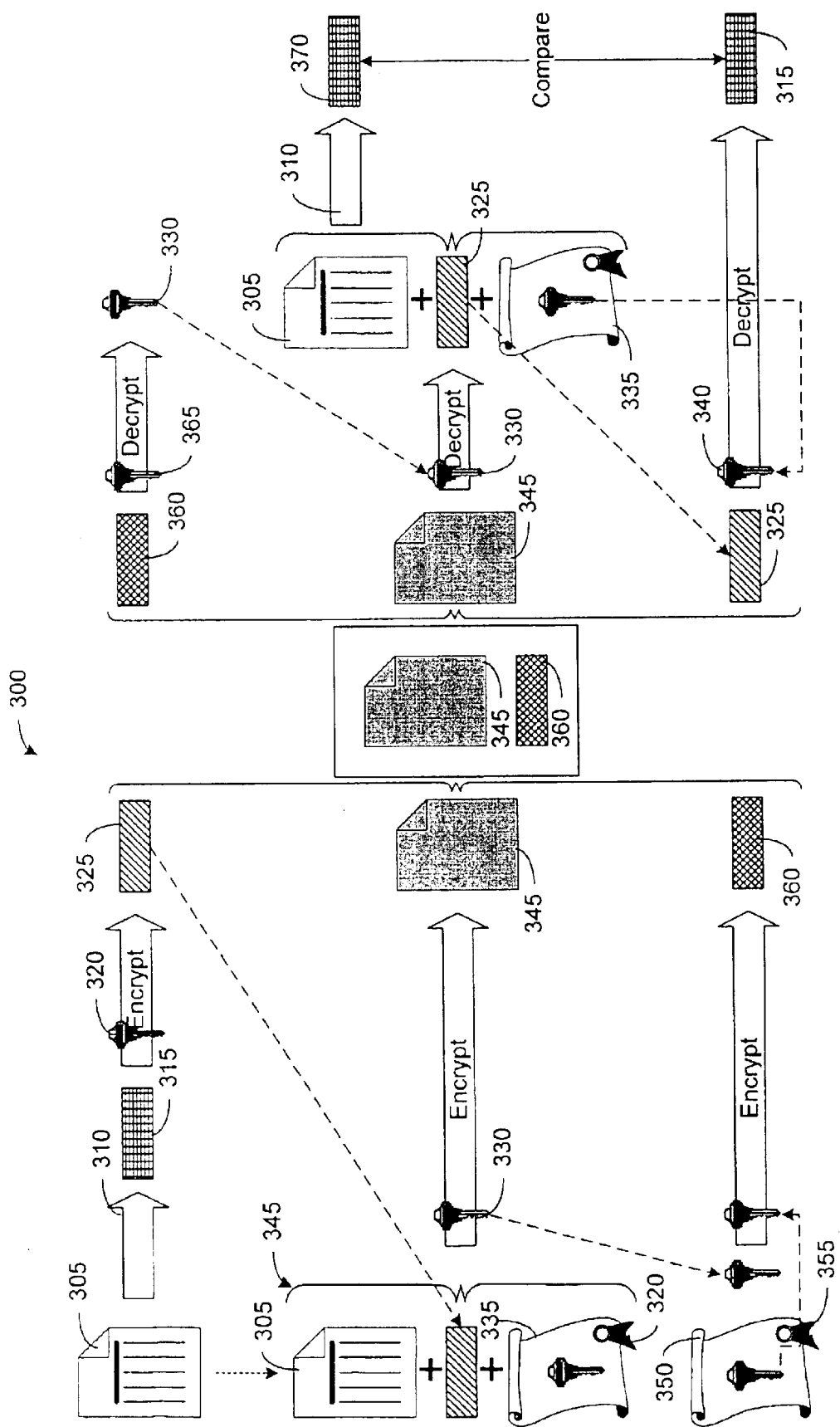
FIG. 3 is a block diagram, which illustrates yet another conventional process of using dual signatures to maintain privacy in secure electronic transactions.
Figure 4:
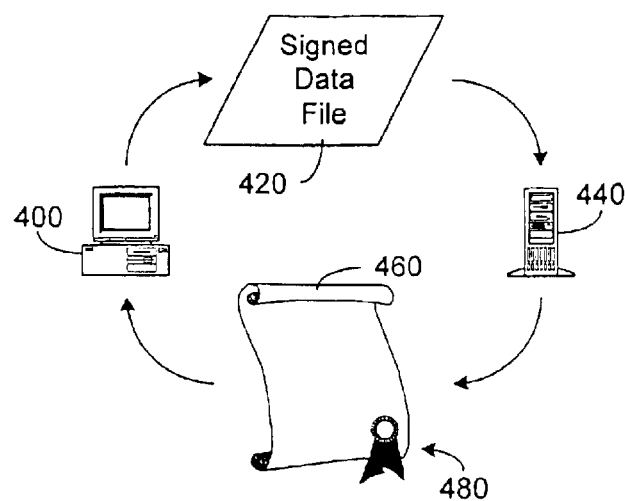
FIG. 4 is a block diagram, which illustrates a conventional digital time-stamping service.
Figure 5:
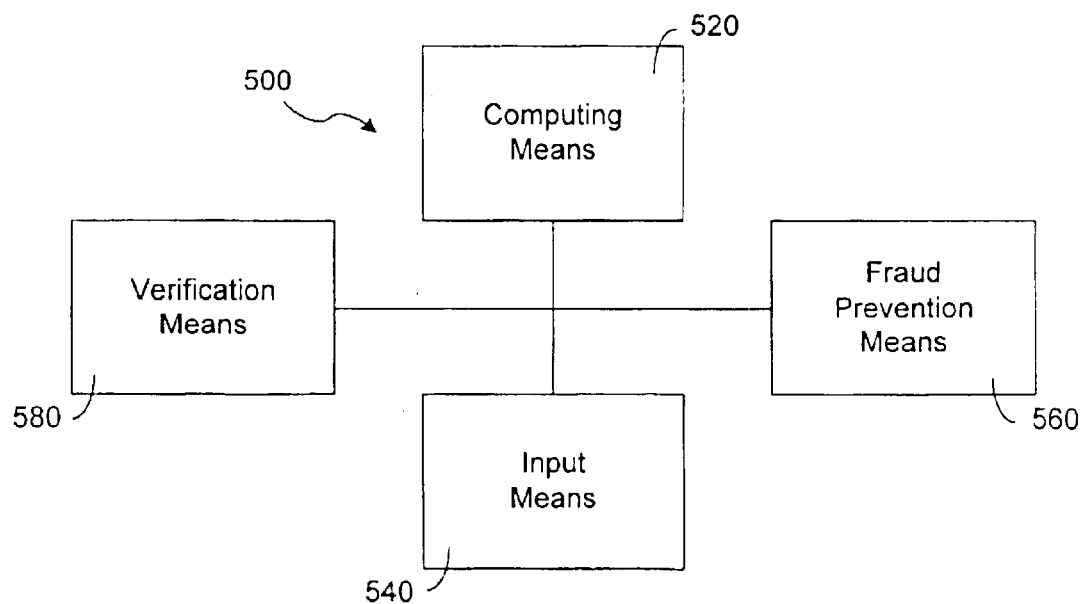
FIG. 5 is a block diagram, which generally illustrates the system according to the present invention.

A system 500 according to the present invention is shown generally in FIG. 5. System 500 suitably comprises a computing means 520, an input means 540, and a fraud prevention means 560, each of which is operatively coupled together. Computing means 520 more specifically comprises a general-purpose computer, such as a personal computer (PC). Input means 540 more specifically comprises any conventional means of inputting digital data to a PC such as a keyboard, a mouse, a touchpad, etc.

Suitable such keyboards include those of the type manufactured by Key Tronic Corporation, Spokane, Wash., U.S.A., and sold under the trademark Lifetime™. These include the Lifetime Classic™, a standard 104-key keyboard adapted for use with PS/2 or AT-style keyboard ports; the Lifetime Classic Wireless™, a battery-operated standard keyboard adapted for use with PS/2 or AT-style keyboard ports through infrared means; the Lifetime Trackball™ and Lifetime Trackball Wireless™, both of which are standard keyboards with an integrated trackball mechanism; and, the Lifetime Touchpad™ and Lifetime Touchpad Wireless™, both of which are standard keyboards having an integrated touchpad.

Other suitable input means 540 include those of the type manufactured by Interlink Electronics, Camarillo, Calif., U.S.A., which employ VersaPad® and VersaPoint® technologies. These include the Model VP9000 ePad™, a semiconductive touchpad and pen input pad that combines the functionalities of a PC touchpad pointing device and a WinTab-compatible graphics digitizer tablet; the DeskStick™ stationary desktop mouse; the RemotePointPLUS™ cordless, programmable mouse; and the FreedomWriterPRO™, a wireless, "all in one" PC input device that replaces pen, mouse, and keyboard for Internet conferencing, group meetings and presentations.

Computing means 520 and input means 540 together, thus, provide a system for creating a digital-imaging file (not shown in FIG. 5). The digital-imaging file is initially created by the computing means 520, either: (1) by entry of data through the input means 540; or, (2) storage of data in the computing means 520. Such storage of data in the computing means 520 may be accomplished through any number of conventional avenues (e.g., e-mail, downloading the digital-imaging file from an Internet website, ftp transfers, and transfers by way of removable media, such as magnetic media including floppy disks, "Super Disks", Clik!™, ZiP™ and Jaz™ disks (all of which are trademarks of Iomega Corporation, Roy, Utah, U.S.A.); optical media, such as CD-ROM, CD-R, CD-RW and DVD; magneto-optical media, etc.).

In the event that a user (not shown) of the computing means 520 locally creates the digital-imaging file, such digital-imaging file would subsequently be saved at a moment in time. Fraud prevention means 560 is used, according to a particularly important aspect of the present invention, to secure the digital-imaging file by maintaining its integrity in the following manner. An unalterable time-stamp is affixed to the digital-imaging file by fraud prevention means 560 by way of computing means 520. Such a time-stamp may thereafter be used to confirm the date and time associated with any access, creation, modification, receipt, saving, or transmission of the digital- imaging file.

Figure 6:
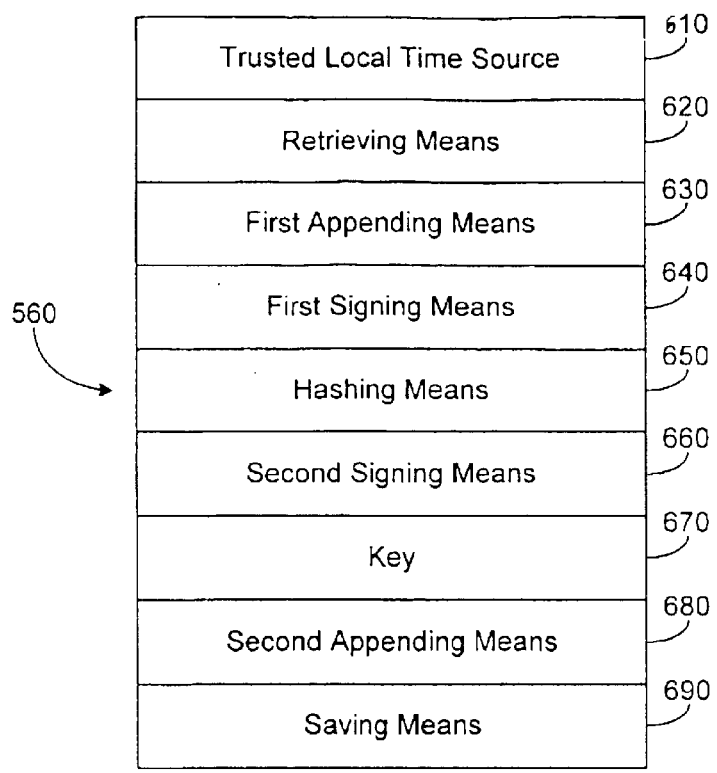
FIG. 6 is a block diagram, which more specifically illustrates the system shown in FIG. 5.

Several embodiments of the present invention will now be described herein after in greater detail with reference to FIGS. 8–16. However, as shown in FIG. 6, fraud prevention means 560 generally comprises a trusted local time source 610; means 620 for retrieving from that local time source 610 a date and a time corresponding to the moment in time that the digital-imaging file was accessed, created, modified, received, or transmitted; means 630 for appending the date and the time retrieved from the trusted time source 610 to the saved digital-imaging file; means 640 for signing the saved digital-imaging file with the date and the time retrieved from the trusted time source 610 appended thereto; means 650 for hashing the signed digital-imaging file to produce a digest; means 660 for signing the digest with a key 670 to produce a certificate; means 680 for appending the certificate to the saved digital-imaging file; and means 690 for saving the digital-imaging file with the certificate appended thereto.

Figure 7:
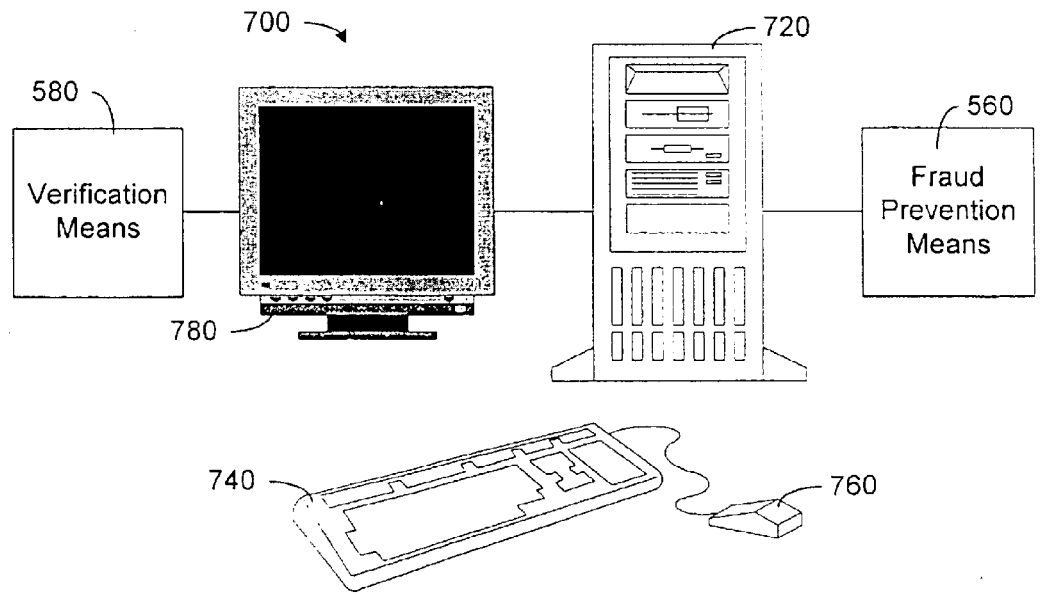
FIG. 7 is a block diagram of a presently preferred embodiment of the PC system according to the present invention.

Referring now to FIG. 7, a block diagram of a presently preferred embodiment of the PC system 700 according to the present invention is shown. System 700 generally comprises a PC 720, having a keyboard 740 and mouse 760 attached thereto for inputting digital data into the PC 720, fraud prevention means 560 for proving with certainty the dates and times that digital-imaging files contained within the PC 720 were accessed, created, modified, stored, or transmitted, and a monitor 780 for displaying such files. As an option, PC 720 may include verification means 580, which are adapted to verify the authenticity of a date and time-stamp affixed to such digital-imaging files.

In the alternative, fraud prevention means 560 may generally comprise a trusted local time source 610; application programming interface (API) means (not shown) for selectively retrieving from local time source 610 a date and a time corresponding to the moment in time that the digital-imaging file was accessed, created, modified, received, saved, or transmitted; means 630 for appending the date and the time retrieved from the trusted time source 610 to the digital-imaging file; and means 690 for saving the digital-imaging file with the date and the time retrieved from the trusted time source 610 appended thereto. In this manner, the fraud prevention means 560 according to this presently preferred embodiment of the invention avoids the necessity of signing, hashing, producing a digest, producing a certificate, and appending that certificate to the digital-imaging file as shown in the embodiment of FIG. 6. However, in the event that the user of such fraud prevention means 560 desires to include such enhanced level of security, the fraud prevention means may further comprise means 640 for signing the saved digital-imaging file with the date and the time retrieved from the trusted time source 610 appended thereto; means 650 for hashing the signed digital-imaging file to produce a digest; means 660 for signing the digest with a key 670 to produce a certificate; and means 680 for appending the certificate to the digital-imaging file.

Where the fraud prevention means 560 includes a tamper-proof real time clock (RTC) on the motherboard or baseboard as described in the aforementioned U.S. Ser. No. 09/429,360, the API means 800 is adapted to retrieve from such RTC a date and a time corresponding to the moment in time that the digital-imaging file was accessed, created, modified, received saved, or transmitted. With other embodiments, such as where the tamperproof RTC is installed on an expansion card, PC card, or smart card as described in the aforementioned U.S. Ser. No. 09/421,279, however, API means 800 is otherwise adapted. In these instances, API means 800 is adapted to sense calls for a timestamp from operating system and/or applications running on the computing means. Thereafter, it uses the date and time from the trusted local time source 610 instead of any date and time of the computing means system clock. Further details regarding the use of the aforedescribed API means is set forth in U.S. Ser. No. 09/609,646, entitled "System and Methods for Proving Dates in Digital Data Files".

Figure 8:
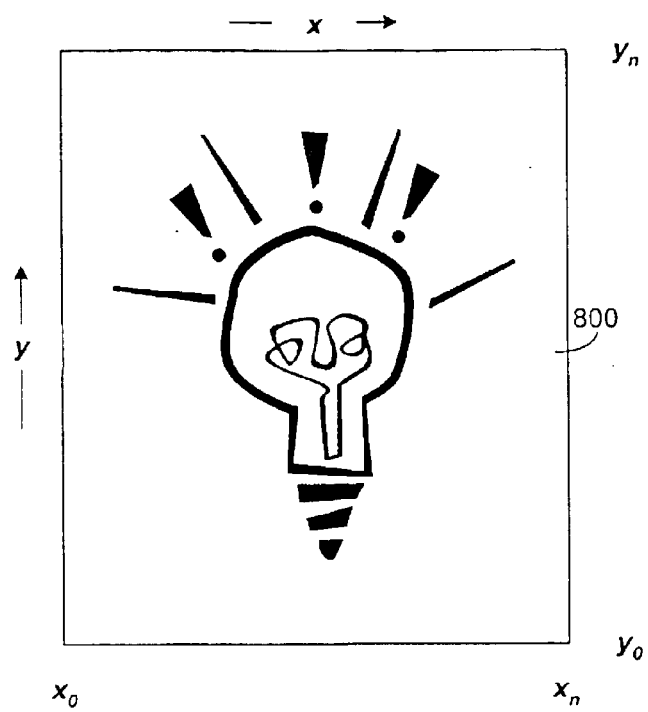
FIG. 8 illustrates a digital-imaging file, the date and time of which is to be proven by the system and methods according to the present invention.
Figure 9:
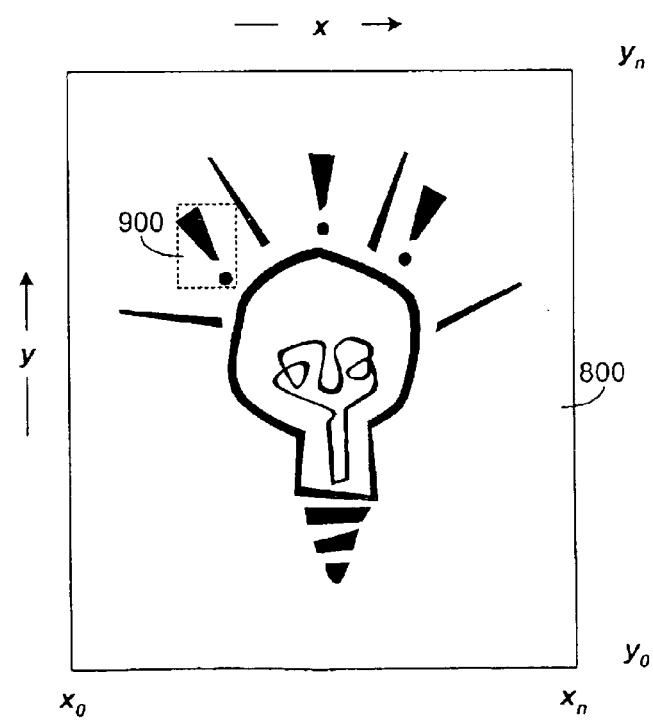
FIG. 9 highlights a selected portion of the digital-imaging file shown in FIG. 8.
Figure 10:
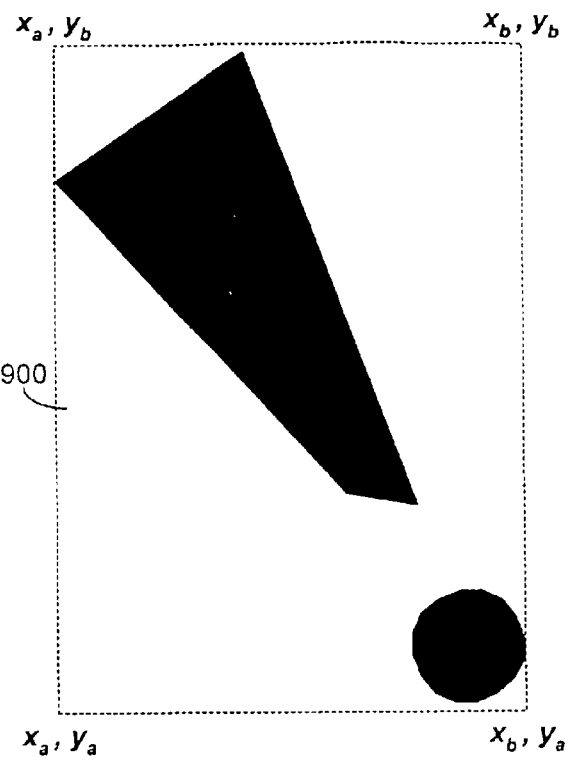
FIG. 10 depicts an enlarged view of the selected portion of the digital-imaging file shown in FIG. 9.

Use of the system 500 for proving dates in digital-imaging files may now be explained by reference to FIGS. 8–10. A two-dimensional digital-imaging file 800 is shown in FIG. 8. Along the X-axis, digital-imaging file 800 extends from $X_0$ to $X_n$, while along the Y-axis, it extends from $Y_0$ to $Y_n$. A selected portion 900 of the digital-imaging file 800 is shown in FIG. 9, and in much greater detail in FIG. 10. Along the X-axis, the selected portion 900 of the digital-imaging file 800 extends from $_a$, $Y_b$ to $X_b$, $Y_b$, while along the Y-axis, it extends from $X_a$, $Y_a$ to $X_b$, $Y_a$.

According to one embodiment of the present invention, the time and date of any accessing, creation, modification, receipt, save, or transmission of the entire digital-imaging file 800, or any selected portion 900 portion thereof may be proven in the following manner. Retrieving means 620 selectively retrieves from the local trusted time source 610 a date and a time corresponding to the moment in time that the digital-imaging file was accessed, created, modified, received, saved, or transmitted. That trusted time and date is then appended to the digital-imaging file 800 or selected portion 900 thereof by appending means 630. Thereafter, means 640 is used to sign the saved digital-imaging file with the date and the time retrieved from the trusted time source 610 appended thereto. Means 650 is then used to hash the signed digital-imaging file to produce a digest, and means 660 is used to sign the digest with a key 670 to produce a certificate. Finally, means 680 is used to append the certificate to the saved digital-imaging file, and means 690 is used to save the digital-imaging file with the certificate appended thereto. Alternatively, API means as set forth in U.S. Ser. No. 09/609,646, entitled "System and Methods for Proving Dates in Digital Data Files" may be used without signing or hashing digital-imaging file 800 or a selected portion 900 thereof. It should be noted that the system and methods described herein are not limited to two-dimensional digital-imaging files, but may be extended to three-dimensional digital-imaging files without departing from the spirit and scope of the present invention. Moreover, by use of the phrase "selected portion of the digital-imaging file", it should be understood that a plurality of selected portions (e.g., a regular or random array of such selected portions) may be time-stamped in any of the foregoing manners. The system and methods of the present invention are, likewise, not limited to static digital-imaging files, but extend to dynamically rendered digital-imaging files such as those produced by digital video recorders, streaming video, and DICOM-Conforming Devices.

Figure 12:
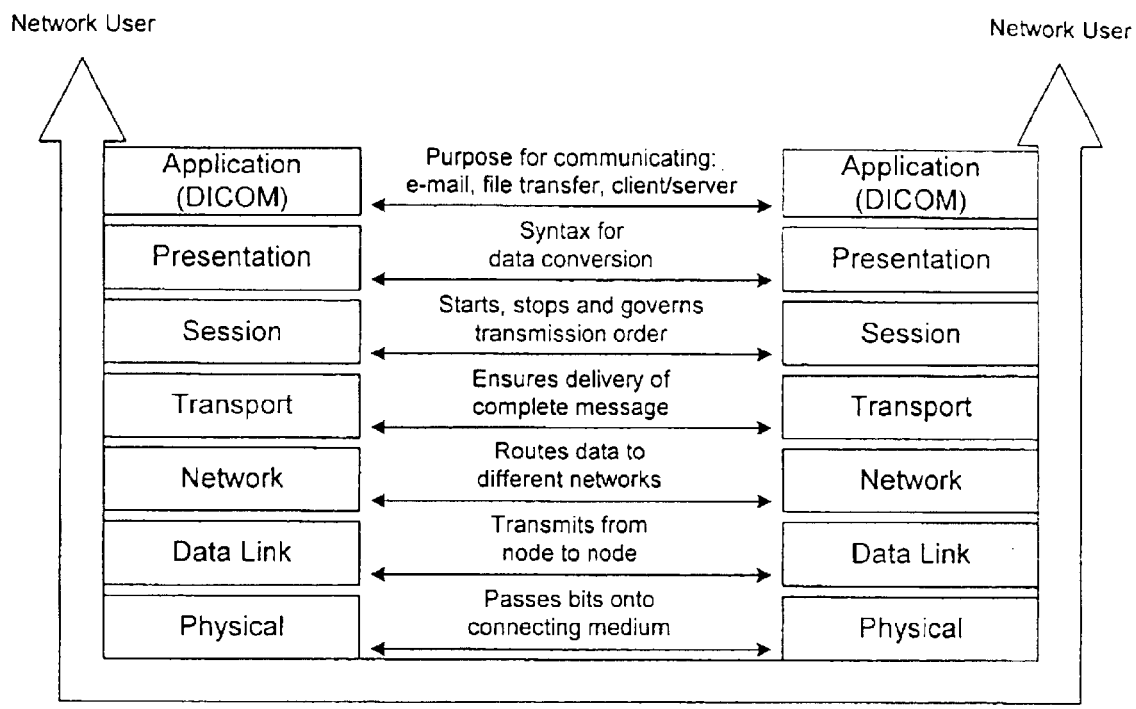
FIG. 12 illustrates communications protocol layers used in the system shown in FIG. 11.

DICOM is the industry standard for transferring medical images and information between electronic devices, and is based on the Open System Interconnect (OSI) reference model, a worldwide communications standard that defines a 7-layer protocol model (FIG. 12). This permits users to integrate imaging equipment from different manufacturers to support a range of modalities, as well as computed radiography and digitized film radiographs. DICOM-conforming devices, such as the Kodak Digital Science™ diagnostic workstation, are now on the market.

DICOM is an acronym for "Digital-imaging and Communications in Medicine", a standard developed by the American College of Radiology (ACR) and National Electrical Manufacturers Association (NEMA). The ACR provides technical direction and medical oversight, and NEMA acts as the publishing entity and provides legal oversight.

Any PACS ("Picture Archiving and Communications System") system should conform to the DICOM standard, but few systems currently on the market conform totally. A system may conform in one area, such as image archiving, but not conform in others, such as remote primary diagnosis, or home teleradiology systems.

When the American College of Radiology (ACR) and the National Electrical Manufacturers Association (NEMA) formed a joint committee early in 1983, their goal was to develop a standard means of interconnection for medical imaging devices. To accomplish this task, the standard would include a dictionary of the data elements needed for proper image display and a hardware specification for physically connecting the devices.

ACR-NEMA, Version 1.0

The ACR-NEMA committee surveyed existing interface standards. None was found to be entirely satisfactory. However, a useful idea was borrowed from a standard format for recording images on magnetic tape, developed by The American Association of Physicists in Medicine. The header portion of that format contained a description of the image along with identifying data elements, such as patient name. A concept of using data elements of variable length identified with a tag or key (i.e., the name of the element) was thought to be particularly important and was, thus. adopted by the committee. A parallel hardware interface was developed for point-to-point connectivity. This interface standard was loosely modeled after an existing instrumentation interface. A networking environment was not considered given the large size of the data sets which would need to be transferred between devices. At the time, neither developers nor end-users of the standard had a clear understanding of the requirements for interconnection and interoperation. The standard, officially known as ACR-NEMA 300-1985, was known in the industry as ACR-NEMA Version 1.0, and was released to the public at the annual meeting of the Radiological Society of North America (RSNA) in 1985. It met with no commercial success, in large part due to the slow progress that was being made in the development of PACS. Nevertheless, potential implementors found ambiguities and incomplete specifications in the standard.

ACR-NEMA, Version 2.0

ACR-NEMA 300-1988, commonly known as ACR-NEMA Version 2.0, was published at RSNA in 1988. This version cleared up some of the ambiguities associated with the protocol. In addition, new data elements were added and the standard content received a much more thorough in proofing. This version, also known as the "50-pin connector" standard, was adopted by only a in handful of vendors including General Electric, Siemens, Philips, and Vortech Data, Inc. (now part of Kodak's Health Imaging Division). The first commercial implementation was shown at RSNA 1990 by GE and Vortech, the only two companies to commercialize the standard.

It became clear that a point-to-point solution did not meet the developing and future needs of the user community. A network standard was needed. Coincident with the marketing of the "50-pin" solution, Vortech developed a version of the standard, which implemented ACR-NEMA Version 2.0 over TCP/IP. Although this "patch" solution did not address all the subtleties of inter-networking, it did allow successful communication of medical images over a network. Siemens and Philips, at the same time, developed the Standard Product Interconnect (SPI), which was also a network implementation of ACR-NEMA Version 2.0. These early network implementations formed the basis for the third version of the standard, DICOM.

ACR-NEMA, Version 3.0 (DICOM)

The focus of DICOM was not only interconnection, but also network interoperation. The standard often is called ACR-NEMA Version 3.0, because it replaced ACR-NEMA Version 2.0. The name was changed to DICOM to reflect the contribution of international organizations as well as the standard's ability to expand beyond the sole support of radiology images. Efforts are being made now to expand the standard to cardiology, endoscopy, and other types of medical images. As noted herein above, the Kodak Digital Science™ CX/DX Workstation is an example of a DICOM-conforming device.

Figure 11:
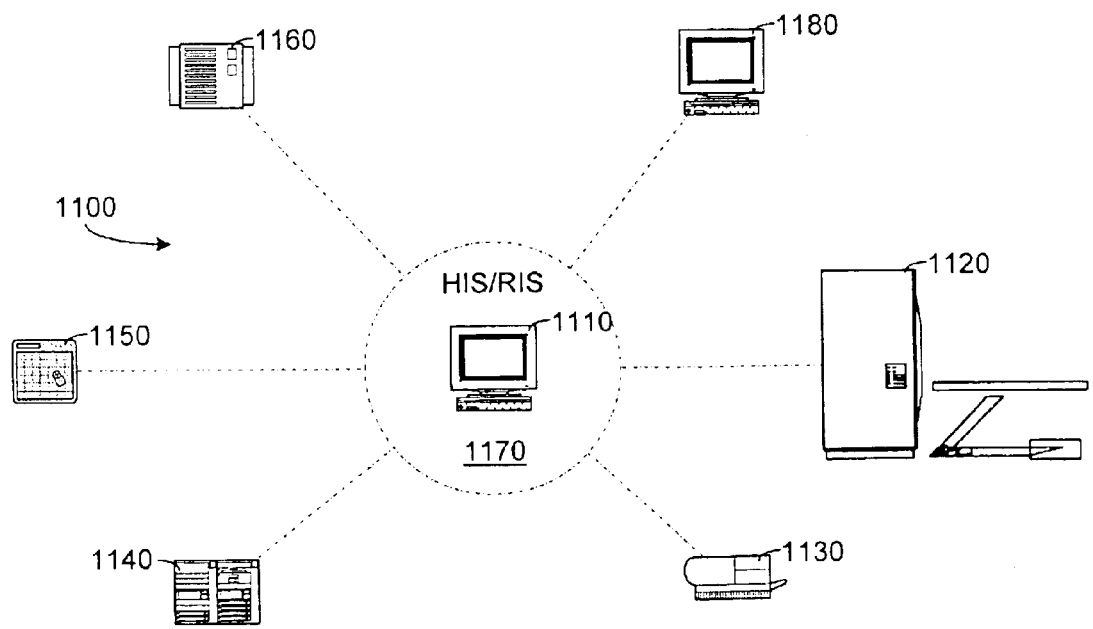
FIG. 11 illustrates a block diagram of a digital communications in medicine (DICOM)-compliant system according to another embodiment of the present invention.

As shown in FIG. 11, a typical DICOM system 1100 includes a local workstation 1110, a modality host 1120, a printer 1130, a CR host (QCW) 1140, a digitizer 1150, and an archive 1160, each of which is connected by a HIS/RIS 1170 to a remote workstation 1180. Workstation 1180, thus, comprises a medical diagnostic and review station, using DICOM services to: (a) import and export images; (b) query the content of other devices; and (c) initiate transfers print images.

Figure 13:
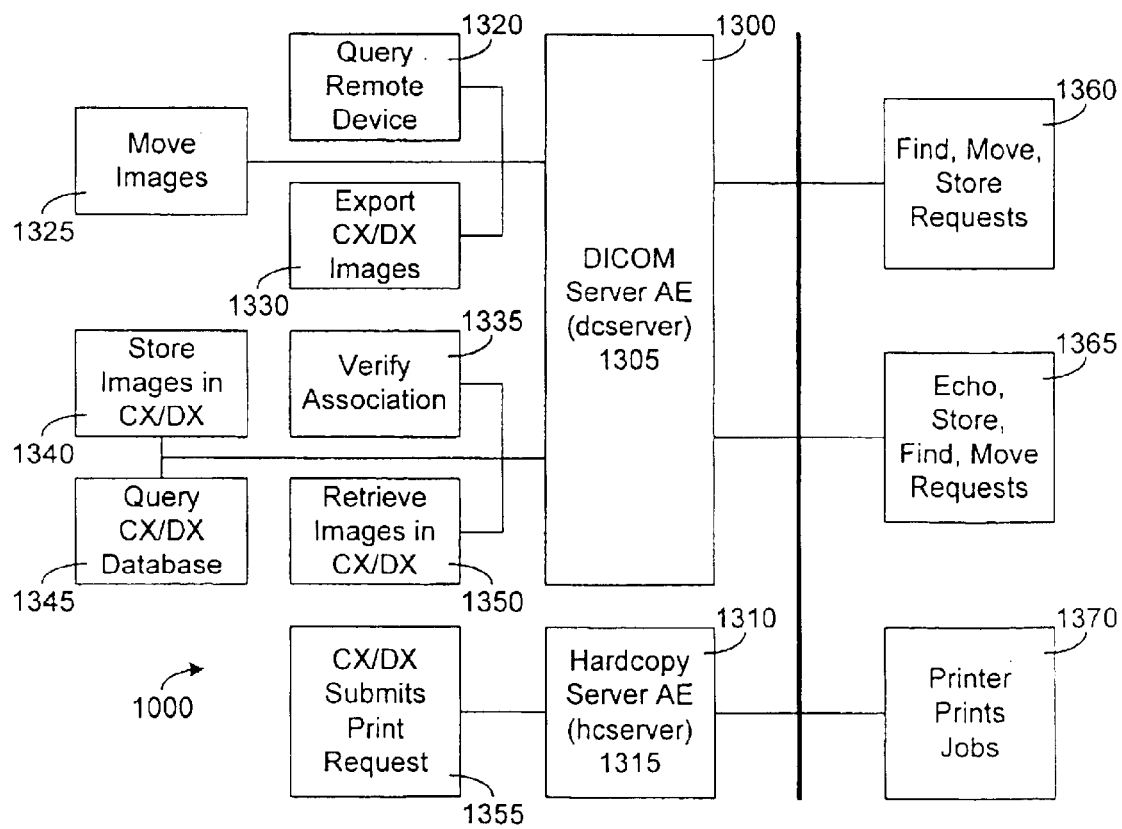
FIG. 13 shows a block diagram of various requests in the system of FIGS. 11 and 12.

Referring now to FIG. 13, DICOM services are implemented using two "application entities": (a) the DICOM Server AE 1300, which is used for image transfers and is implemented by a UNIX application called "dcserver"1305; and (b) the Hardcopy Server AE 1310, which is used for printing and is implemented by a UNIX application called "hcserver"1315.

The dcserver 1305 is expected to be running on the local workstation 1110. A remote application entity initiates an association for storage services. Upon notification of acceptance of the association parameters, the remote application entity sends information objects to the dcserver 1305 that stores them in a local database for future use by the CX/DX workstation software.

The CX/DX workstation user initiates Query and Retrieve requests using the dcserver 1305 component, generally by interaction with a User Interface. The dcserver 1305 component initiates an association with the Remote Application Entity and uses the Query or Retrieve Service Classes to issue commands. The Remote Application Entity responds as a Query/Retrieve Service Class Provider performing C-FIND and C-MOVE operations as required. The dcserver 1305 component passes the status responses for these commands to the CXPDX workstation User Interface for interpretation and display.

The hcserver 1315 can be running on the local 1110 or a remote workstation 1180. The CX/DX workstation application using the hcserver requests printing to a print device. The hcserver 1315 initiates an association with a DICOM print SCP for the purpose of printing the job requested by the application. The hcserver 1315 can handle simultaneous associations with a number of DICOM print SCPs.

Functional Definitions of Application Entities

The dcserver 1305 component operates as a daemon. The startup sequence of the CX/DX workstation system initiates its execution. The dcserver 1305 is left running whether the CX/DX workstation software is operational or not. The dcserver uses a configuration file that contains information used to validate association attempts from Remote Application entities. The dcserver 1305 then listens on the configured port for association requests.

An association request for Storage Services from a Remote Application Entity causes dcserver 1305 to validate the request according to the configuration parameters set at execution time. The Remote Application Entity then sends the Information Object Instance. The dcserver 1305 stores the received Information Object Instance in its local database if the data does not already exist. The data remains in the database until removed by some action external to this Application Entity.

An association request from a Remote Application Entity for Query or Move Services causes dcserver 1305 to validate the request according to the configuration parameters set at execution time. The Remote Application Entity then sends the Query or Retrieve request. The dcserver searches the local database for the instance(s) specified. If the request was C_FIND, then a response is returned for each match. If the request was C_MOVE, then an association is originated to the destination Application Entity specified in the C_MOVE message. Incremental responses are sent to the C_MOVE originator to indicate progress of the request.

A request from the CX/DX workstation User Interface causes the dcserver 1305 component to initiate an association with a Remote Application Entity. The Service Classes offered are specified in the configuration file. The user can then initiate query and retrieve requests to dcserver that are sent to the Remote Application Entity. The CX/DX workstation User Interface displays the responses from the Remote Application Entity.

The hcserver 1315 component operates as a daemon. The startup sequence of the CX/DX workstation system initiates its execution. The hcserver 1315 is left running whether the CX/DX workstation software is operational or not. The hcserver 1315 uses a configuration file to determine the list of printer devices connected to the server and the properties of each printer. Association and release requests are logged to the UNIX syslog daemon (syslogd) as local7.info messages. Various errors and warning indications are also logged using syslogd.

Further details regarding workstation 1110 may be found in the *Kodak Digital Science™ CX/DX Workstation DICOM Conformance Statement* (Document No: 3H8353—Version 2.1.7, Nov. 23, 1998), the *Kodak Digital Science Medical Viewing Station DICOM Conformance Statement* (Document No: 6C8324—Version 2.1, Oct. 13, 1997), the *Kodak Digital Science Modality Acquisition Unit (MAU) DICOM 3.0 Conformance Statement* (Document No: 6C7107—Version 7.3, Jun. 4, 1998), the *Kodak Digital Science DICOM Print Spooler, Model* 100, a component of the *Kodak Ektascan CP DICOM Input Package DICOM Conformance Statement* (Document No: 6C7107—Version 2.3, Apr. 7, 1998), the *Kodak Digital Science Film Digitizer DICOM Conformance Statement* (Document No: 6C7311, Rev. A—Version 4.3.2, Oct. 27, 1997), the *Kodak Digital Science Medical Image and Information Library DICOM Conformance Statement* (Document No: 6C8816, Rev. E—Version 3.0, Oct. 4, 1998), the *Kodak Digital Science Medical Image Manager DICOM Conformance Statement* (Document No: 2E0139—Version 2.1 Nov. 4, 1998), the *Kodak Digital Science Medical Laser Printer* 190 *DICOM Conference Statement* (P/N 990515—Version 2.5, Jan. 1, 1998), the *Kodak Digital Science Print Interface Unit (PIU) DICOM 3.0 Conformance Statement* (Document No: 6C7108–Version 8.3 Apr. 1998), the *Kquality Control Workstation for the Computed Radiography System* 400 *DICOM Conformance Statement* (Document No: 6C6238—Version 4.00.01, Apr. 3, 1998), the contents of each of which is incorporated herein by reference.

In accordance with yet another important aspect of the present invention, the methods herein employ a privately defined unique identifier (UIDs), as provided for in DICOM to uniquely identify items such as Specialized or Private SOP Classes, Image SOP Instances, Study SOP Instances, etc. UIDs are formed using a registered root (see, e.g., Annex C of the DICOM Standard) and an organization specific suffix. The manner in which the suffix of a Privately Defined UID is defined is not constrained by the DICOM Standard. Only the guarantee of its uniqueness by the defining organization is required by DICOM. This example presents a particular choice made by a specific organization in defining its suffix to guarantee uniqueness. A variant is discussed.

"1.2.840.xxxxx.3.152.235.2.12.187636473" root. suffix In this example, the root is:

| | |
|---|---|
| 1 | Identifies ISO |
| 2 | Identifies ANSI Member Body |
| 840 | Country code of a specific Member Body (U.S. for ANSI) |
| xxxxx | Identifies a specific Organization. (provided by ANSI) |

In this example the first two components of the suffix relate to the identification of the device:

| | |
|---|---|
| 3 | Manufacturer or user defined device type |
| 152 | Manufacturer or user defined serial number |

The remaining four components of the suffix relate to the identification of the image:

| | |
|---|---|
| 235 | Study number |
| 2 | Series number |
| 12 | Image number |
| 187636473 | Encoded date and time stamp of image acquisition (as provided by the fraud prevention means 420 incorporated within the DICOM-compliant device). |

In this example, the organization has chosen these components to guarantee uniqueness. Other originations may choose an entirely different series of components to uniquely identify its images. In this example, the organization has chosen these components to guarantee uniqueness.

Other organizations may choose an entirely different series of components to uniquely identify its images. For example, it may have been perfectly valid to omit the Study Number, Series Number and Image Number if the time stamp had a sufficient precision to ensure that no two images might have the same date and time stamp. The present invention permits this.

Figure 14:
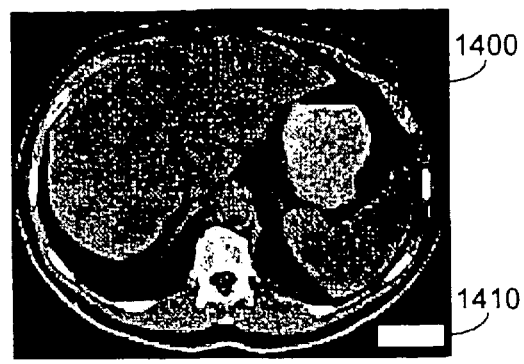
FIG. 14 illustrates a digital-imaging file as the result of a first phase in a helical tri-phase liver scan using computerized tomography (CT)
Figure 15:
FIGS. 15 shows digital-imaging file as the result of a second phase in a helical tri-phase liver scan using computerized tomography (CT)
Figure 16:
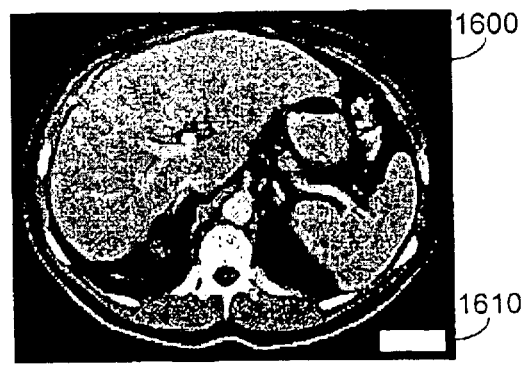
FIG. 16 digital-imaging file as the result of a third phase in a helical tri-phase liver scan using computerized tomography (CT).

Referring now to FIGS. 14–16, the advantages of using the system and methods according to the present invention for digital-imaging files will now be explained. FIG. 14 shows a digital-imaging file 1400 of a patient who has chronic hepatitis and suspected hemochromatosis. CT study was performed to evaluate for possible hepatoma. The examination was performed using a triple pass technique as follows: (a) first pass (image thickness/table speed) 2.5/15 mrn; (b) second pass (image thickness/table speed) 5/15 Q; and (c) third pass (image thickness/table speed) 5/22.5.

The first pass as shown in FIG. 14 is obtained at aortic peak plus 10 seconds, the second pass (FIG. 15) between 10 and 20 seconds after aortic peak, and the third pass (FIG. 16) 60 seconds after the beginning of the intravenous bolus injection. Aortic peak is determined from a preliminary mini bolus. Bolus contrast injection for the study is 5 cc/sec for 30 seconds of 60% iodinated contrast material. The first two passes are obtained during a single breath-hold and the third pass in a separate breath-hold. It can be seen, therefore, that the relative timing of each pass is important to note, not only for diagnostic purposes, but also for the purpose of supporting later made claims for insurance and the like. In the event that a malpractice claim is later made for improper or negligent misdiagnosis, the digital-imaging files shown in FIGS. 14–16 could be crucial, especially since each of them would be appropriately time-stamped in accordance with the present invention. The time-stamps 1410, 1510, and 1610 shown respectively on digital-imaging files 1400, 1500, and may be compared to other appropriate data in determining whether malpractice could be proven.

Variations and modifications of the above described methods and systems according to this invention are possible without departing from the true spirit and scope thereof. For example, fraud prevention means 560 may be initially installed on motherboards or baseboards in the manner described above. Alternatively, they may be retrofitted in existing PCs; or they may be installed on expansion cards of the PCI and ISA types supported by such motherboards and baseboards; or they may be installed in an external device such as a dongle coupled to such PCs.

Such expansion cards and external devices, therefore, would each include an RTC set to the trusted time and having a tamper-evident label attached thereto. In that case, such RTCs on the expansion cards and external devices would be include the API means 800 to selectively bypass any system RTC on the motherboard or baseboard. They would, thus, not interfere with such system RTCs, and would only be used to affix a trusted time-stamp to any or all digital-imaging files in the foregoing manner.

Conventional intrusion alarms of PCs and servers could also be coupled to provide a signal to the fraud prevention means 560. In that case, any activation of the signal, which would indicate an occurrence of an intrusion, would be used to disable operation of the fraud prevention means 560. Fraud prevention means 560 would not only be capable of recognizing other certificates from CAs known in the PKI environment, but they would also be capable of being used in conjunction with any of the above described Internet protocols.

The verification means 580 according to the present invention could, likewise, be coupled within fraud prevention means 560 and provide a simple means for determining that a received message that was time-stamped by a remote system 700 was, indeed, time-certified. Alternatively, verification means 580 may comprise any biometric device (e.g., iris scan, retina scan, finger scan, hand geometry, voice verification, and dynamic signature verification devices, etc.) may be used in order to further verify the identity of a user of a local PC system 700. Suitable such devices include face recognition devices manufactured and sold by Visionics Corporation, Exchange Place, N.J. U.S.A., fingerprint readers of the SecureTouch® 97 type manufactured by Biometric Access Corporation, Round Rock, Tex. U.S.A., and multiple access devices manufactured by Keyware Technologies.

Finally, the system 700 according to the present invention may simply comprise a stand-alone PC, a server, a PC or workstation coupled to a server, a LAN, WAN, MAN, each of which comprises a plurality of PCs, workstations, and servers. All that is necessary is that the PC or workstation and/or server include fraud prevention means 560 as previously described.

It should, therefore, be understood that within the scope of the claims appended hereto, the present invention may be practiced otherwise than has been specifically described in the foregoing embodiments.

What I claim as my invention is:

1. A system for maintaining trust in content of a digital image file, comprising:
   a trusted time source to provide a certifiable time for an unalterable time stamp, wherein said certifiable time confirms at least one of said digital image file's access, creation, modification, receipt, or transmission;
   means for receiving said request to save said digital image file from a user;
   first means for saving said digital image file at a moment in time;
   means for retrieving from said trusted time source a date and a time corresponding to said moment in time, wherein said moment in time is substantially current time of said trusted time source corresponding to receipt of said request;
   first means for appending said date and said time retrieved from said trusted time source to said digital image file;
   first means for signing said digital image file with said date and said time retrieved from said trusted time source appended thereto;
   means for hashing said digital image file to produce a digest;
   second means for signing said digest with a key to produce a certificate;
   second means for appending said certificate to said digital image file;
   second means for saving said digital image file with said certificate appended thereto;
   means for modifying said digital image file with said certificate appended thereto into a modified digital image file, wherein said modifying includes at least one of converting or enhancing;
   third means for appending said digital image file with said certificate appended thereto to said modified digital image file; and
   means for verifying trust in the content of said digital image file with said certificate appended thereto.

2. The system of claim 1, further comprising:
   second means for receiving a second request to save said modified digital image file from said user;
   third means for saving said modified digital image file at a second moment in time;
   second means for retrieving from said trusted time source a second date and a second time corresponding to said second moment in time, wherein said second moment in time is substantially a second current time of said trusted time source corresponding to receipt of said second request;
   third means for appending said second date and said second time retrieved from said trusted time source to said modified digital image file;
   third means for signing said modified digital image file with said second date and said second time retrieved from said trusted time source appended thereto;
   second means for hashing said modified digital image file to produce a second digest;
   fourth means for signing said second digest with a second key to produce a second certificate;
   fourth means for appending said second certificate to said modified digital image file;
   fourth means for saving said modified digital image file with said second certificate appended thereto; and
   second means for verifying trust in the content of said modified digital image file with said second certificate appended thereto.

3. The system of claim 2, wherein said modified digital image file with said second certificate appended thereto includes said digital image file with said certificate appended thereto.

4. The system of claim 1, wherein said verification means includes a third means for signing said digital image file with said date and said time retrieved from said trusted time source appended thereto with an identifier.

5. The system of claim 4, wherein said identifier corresponds to said user and is elected from the group consisting of a platform identifier, a server node identifier, and a network identifier.

6. The system of claim 4, wherein said identifier is selected from the group consisting of an identifier corresponding to said user, an identifier corresponding to a system used by said user, and an identifier corresponding to an enterprise within which said user uses said computing means.

7. The system of claim 4, wherein said user identifier is selected from the group consisting of a plurality of characters identifying said user, first data representing an iris scan of said user, second data representing a retina scan of said user, third data representing a finger scan of said user, fourth data representing said user's hand geometry, fifth data representing said user's voice, sixth data representing said user's signature, and combinations of said plurality of characters, first, second, third, fourth, fifth, and sixth data.

8. The system of claim 1, wherein said trusted time source includes a tamper-evident means.

9. A method for maintaining trust in content of a digital image file, comprising:
   providing, with a trusted time source, a certifiable time for an unalterable time stamp, wherein said certifiable time confirms at least one of said digital image file's access, creation, modification, receipt, or transmission;
   receiving said request to save said digital image file from a user;
   saving said digital image file at a moment in time;
   retrieving from said trusted time source a date and a time corresponding to said moment in time, wherein said moment in time is substantially current time of said trusted time source corresponding to receipt of said request;
   appending said date and said time retrieved from said trusted time source to said digital image file;
   signing said digital image file with said date and said time retrieved from said trusted time source appended thereto;
   hashing said digital image file to produce a digest;
   signing said digest with a key to produce a certificate;
   appending said certificate to said digital image file;
   saving said digital image file with said certificate appended thereto; and
   verifying trust in the content of said digital image file with said certificate appended thereto.

10. The method of claim 9, further comprising:
    receiving a second request to save said modified digital image file from said user;
    saving said modified digital image file at a second moment in time;
    retrieving from said trusted time source a second date and a second time corresponding to said second moment in time, wherein said second moment in time is substantially a second current time of said trusted time source corresponding to receipt of said second request;
    appending said second date and said second time retrieved from said trusted time source to said modified digital image file;
    signing said modified digital image file with said second date and said second time retrieved from said trusted time source appended thereto;
    hashing said modified digital image file to produce a second digest;
    signing said second digest with a second key to produce a second certificate;
    appending said second certificate to said modified digital image file;
    saving said modified digital image file with said second certificate appended thereto; and
    verifying trust in the content of said modified digital image file with said second certificate appended thereto.

11. The method of claim 9, wherein said modified digital image file with said second certificate appended thereto includes said digital image file with said certificate appended thereto.

12. The method of claim 9, wherein said verification includes signing said digital image file with said date and said time retrieved from said trusted time source appended thereto with an identifier.

13. The method of claim 12, wherein said identifier corresponds to said user and is elected from the group consisting of a platform identifier, a server node identifier, and a network identifier.

14. The method of claim 12, wherein said identifier is selected from the group consisting of an identifier corresponding to said user, an identifier corresponding to a system used by said user, and an identifier corresponding to an enterprise within which said user uses the comprising means.

15. The method of claim 12, wherein said user identifier is selected from the group consisting of a plurality of characters identifying said user, first data representing an iris scan of said user, second data representing a retina scan of said user, third data representing a finger scan of said user, fourth data representing said user's hand geometry, fifth data representing said user's voice, sixth data representing said user's signature, and combinations of said plurality of characters, first, second, third, fourth, fifth, and sixth data.

16. The method of claim 9, wherein said trusted time source includes tamper-evident protection.

* * * * *